Feb. 21, 1939. H. T. WHEELER 2,148,093
ROTARY PACKING
Filed Oct. 11, 1934 2 Sheets-Sheet 1

Harley T. Wheeler
Jesse F. Stone
INVENTOR.
BY Lester B. Clark
ATTORNEYS.

Feb. 21, 1939.   H. T. WHEELER   2,148,093
ROTARY PACKING
Filed Oct. 11, 1934   2 Sheets-Sheet 2

Harley T. Wheeler
INVENTOR.
Jesse R. Stone
Lester B. Clark
BY
ATTORNEYS.

Patented Feb. 21, 1939

2,148,093

UNITED STATES PATENT OFFICE 2,148,093

ROTARY PACKING

Harley T. Wheeler, Dallas, Tex.

Application October 11, 1934, Serial No. 747,828

4 Claims. (Cl. 286—7)

My invention relates to packing for use on rotating or oscillating shafts which are subjected to high pressures, temperatures and speeds.

It is an object of the invention to provide a packing capable of establishing pressure differentials between all moving parts which counteract the total end thrust of the fluid pressure against the packing structure.

I desire to form a packing assembly which is capable of automatic adjustment to accommodate irregularities in the movement of the shaft and still preserve a tight seal in operation.

It is a further object of the invention to minimize the friction between the various packing elements and still preserve a fluid seal.

I desire to provide a series of packing rings some of which rotate relative to adjacent rings at varying speeds and in which pressure fluid is employed as a lubricating element to prevent undue friction. I have as a further object to provide a packing assembly which may employ frusto-conical molded rings in the main packing element thus causing a self-centering action which steadies the element upon the shaft and produces a constantly tight joint between that element and the adjacent moving parts.

My invention is capable of slight modification to accommodate the same for use upon comparatively low pressures or upon medium high or extremely high pressures which may be encountered in the use of my invention.

Referring to the drawings herewith, Fig. 1 is a central longitudinal section through a rotary packing unit built according to my invention.

Figs. 2, 2a and 2b are front elevations of packing discs which may be used, showing the manner in which seepage openings are formed therein.

Fig. 8b is a similar view of a ring V-shaped in cross section.

Fig. 8c is a front view of a packing ring such as is shown in Fig. 8.

Figure 1:
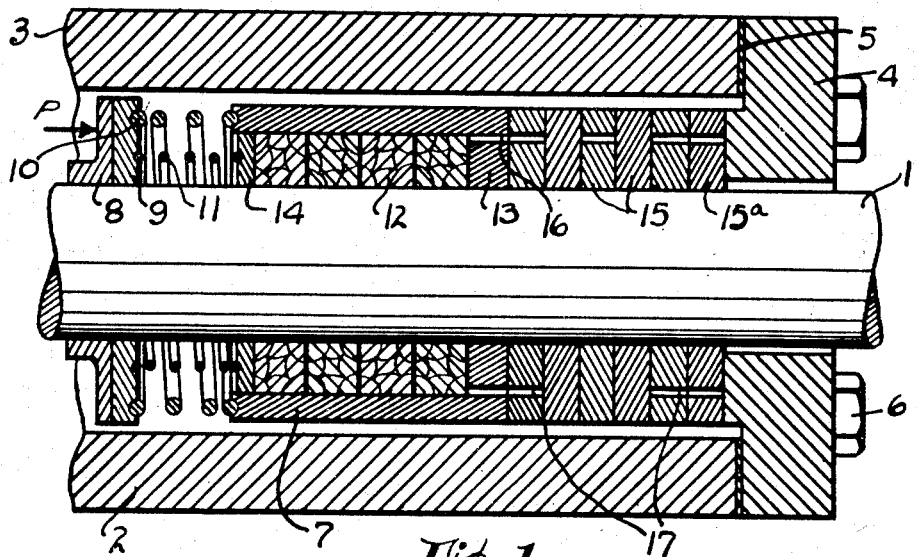

Referring to the Fig. 1 embodiment of the invention I have shown a shaft 1 which may be a rotating shaft operating under medium heavy fluid pressures exerted along the line shown by the arrow P. A stuffing box is formed about the shaft having an outer wall 2 which is understood as being connected with the body of the machine, such as a pump or compressor, at 3. The outer end of the stuffing box is adapted to be closed in the usual manner by a plate or gland 4 having a fluid tight connection by means of the gasket 5 with the outer end of the stuffing box. Said gland is forced into clamping position against the packing by means of cap screws or bolts 6.

The rod is packed about by a set of packing members enclosed within a cage or cartridge 7. Inwardly from the cartridge is a stationary flange or plate 8 which may be shrunk upon the shaft and rotatable therewith. Adjacent this flange is a stop plate or washer 9 also rotatable on the shaft and furnishing a seat or thrust member for the springs 10 and 11. The cage 7 is moved outwardly relative to the source of fluid pressure by means of the spring 10 which bears at its outer end against the end of the cage 7. Within the cage are a series of porous packing rings 12 and these rings may be ordinary braided or fabric rings. At one end these rings bear against an inwardly directed flange 13 upon the cage. At the other end of this ring assembly is a slidable washer 14, which is held resiliently against the packing rings by means of the spring 11 previously noted. It will be seen therefore that the packing rings 13 are under pressure longitudinally of the shaft to hold said rings yieldingly against the shaft so as to seal off the passage of fluid along the shaft.

Between the end of the cage assembly just described and the inner end of the gland 4 are a series of discs or plates 15, which may be of molded material, the sides of which are smoothed off so that the discs may bear against the sides of the adjacent discs without excessive friction and allow rotation of the discs relative to each other.

Figure 2:
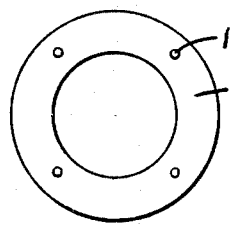

I provide for a lubrication of the adjacent sides of the discs 15 through the small openings or channels 16 in the end wall of the cage, and 17 in the rings. These openings are aligned longitudinally of the rings but as the rings are relatively rotatable the said openings will not be in registration with each other except at intervals. The openings 17 through the rings are shown in Figs. 2, 2a, and 2b, illustrating that said openings may be varied in number as is illustrated in these views.

In operation of this packing installation it will be noted that the cage or cartridge 7 with its installation of packing rings is adapted to rotate with the shaft but at a speed somewhat less than that of the shaft. The complete cage together with the springs and stop plate are free to rotate and will have a slight relative rotation slower than that of the shaft. Also each of the separate discs or plates 15 are independently rotatable upon the shaft and those plates that are adjacent the cage 7 will rotate at a faster speed relative to the shaft than does each adjacent plate away from the said cage. The relative rotation of the discs or plates 15 causes one side of the discs to move relative to the adjacent sides of contiguous rings. This relative rotation is lubricated through the pressure fluid finding passage longitudinally of the installation through the channels or openings 16 and 17 and this passage of fluid will be comparatively slow due to the fact that the openings 17 are aligned with those in adjacent discs only occasionally.

There will be a film of fluid between each of the adjacent discs or plates 15 so that one may rotate slower than the other as the distance from the cage 7 increases so that the last disc or plate shown at 15a adjacent the gland 4 will have only a slight rotation relative to the gland.

It will be noted that the packing in the cage 7 will have no packing effect around the inner wall of the stuffing box but that the escape of pressure fluid from the stuffing box and past the plates or discs 15 will only be by way of the space between adjacent plates 15 and that as there is little relative rotation between the last disc 15a and the gland there will be little chance for escape of pressure fluid past the discs 15.

Figure 3:
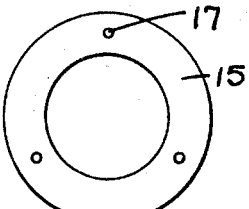
Fig. 3 is a view similar to Fig. 1, but illustrating a slightly different embodiment of the invention.
Figure 3:
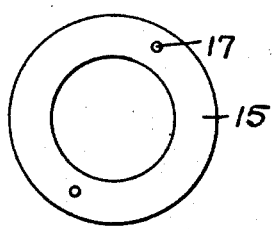
Figure 3:
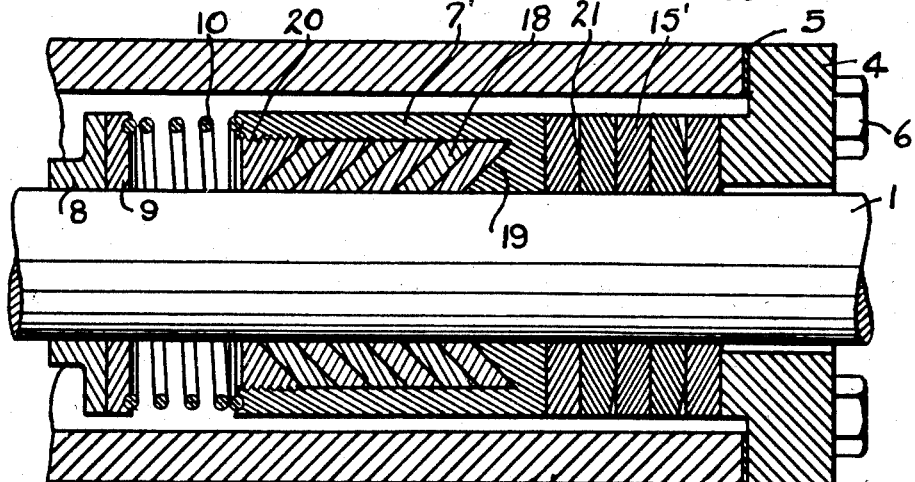

For pressures low relative to those shown in the Fig. 1 embodiment I may employ a modified form shown in Fig. 3. In this case the cage 7' is formed to receive porous packing rings 18, which are frusto-conical in shape and preferably of porous material. The end wall of the cage is inclined at 19 to bear against the sloping end of the adjacent ring 18 and a stationary gland or ring 20 is screwed into the outer end of the box and shaped to conform to the end of the packing ring installation 18. The cage 7' is held resiliently toward the rings 15' by means of the spring 10 as in the previous embodiment.

It is to be noted that with the frusto-conical type of packing ring no spring pressure upon the packing assembly is necessary. This is because the pressure fluid exerts a thrust against the end of the frusto-conical rings and this thrust tends to force the inner ends of the rings away from the source of pressure and clamp the rings into a more or less radial position relative to the shaft and by so doing causes the inner faces of the rings to hug the shaft 1 and have a sealing effect therewith. These rings being thus self-expanding may be used without a spring or similar device for expanding the same and will thus be sufficient to pack off against relatively low fluid pressure.

Figure 4:
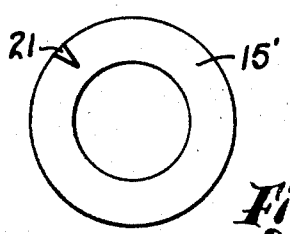
Fig. 4 is a side elevation of the packing disc such as is employed in the Fig. 3 embodiment.

In this embodiment the discs or plates 15' are not formed with longitudinal seepage openings but the adjacent faces are lubricated by the pressure fluid finding entrance through notches of relatively V-shape shown in Fig. 4, at 21.

In the operation of this installation the effect is the same as in the preceding installation. The pressure fluid will be sealed against passage along the shaft by the packing assembly within the cage 7', the passage of pressure fluid around the packing installation will be sealed off by the rings 15' which have a rotation relative to each other as in the previous embodiment. The adjacent faces of the packing discs being lubricated by pressure fluid finding entrance between the plates through the notches 21. It will be understood that a film of pressure fluid between the adjacent plates tends to cause a slight separation of the plates and this allows the film of fluid to lubricate the adjacent faces.

Figures 5, 6:
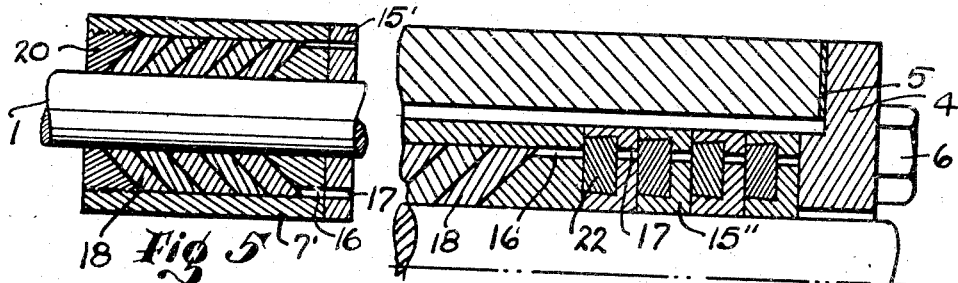
Fig. 5 is a sectional view of a packing element in which seepage openings are provided through the end of the casing.
Fig. 6 is a broken longitudinal view showing one portion of the packing assembly in which porous packing rings are employed across the seepage openings.

In case of necessity the end wall 19 of the cage 7' may be perforated to allow the passage of pressure fluid to the adjacent disc or plate 15', as shown in Fig. 5. This perforation at ordinarily low pressure will be unnecessary.

In Fig. 6 I have shown a means of increasing the sealing effect between the adjacent discs. This is accomplished by an insert 22 of porous material of annular shape inserted within one face of each of the adjacent rings 15''. These porous inserts are set in the wall of each plate along the line of the seepage openings 17, so that when pressure fluid passes through the openings 15' in the end wall of the cage it will encounter the porous insert and will tend to saturate and expand the same and pass therethrough downstream to each of the successive inserts. This arrangement will obviously form a closer seal between the adjacent plates 15'' and will slow down to some extent the seepage of the pressure fluid to adjacent rings. This type of packing may be employed for volatile fluid such as gasoline and the like where a poor lubricating film is obtained by use of the pressure fluid.

Figures 6B, 7, 8, 8A:
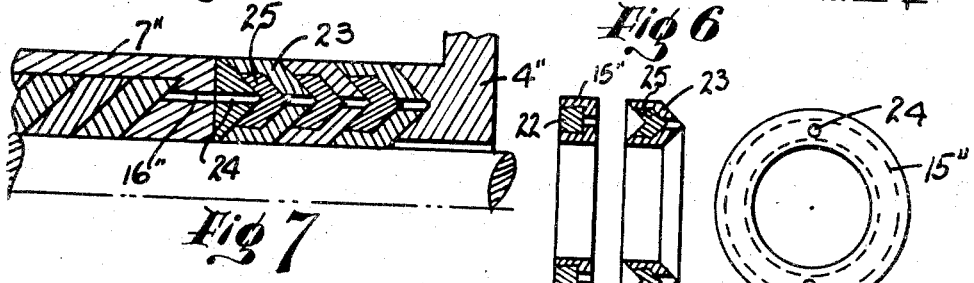
Fig. 7 is a view similar to Fig. 6 but illustrating a different type of rotating disc.
Fig. 8 is a transverse section through a packing element showing a porous insert therein.

Modifications of the arrangement of the discs 15'' is shown in Figs. 7 and 8. In Fig. 7 the adjacent discs 23 are shown as being formed V-shape in cross section. The seepage passage extends midway between the edges of the rings and longitudinally of the V-portion of the ring. The insert of porous material 25 is set in the inner side of the ring and in a position to be expanded by the pressure fluid. The rings are made of this particular shape so as to make them self-centering and interlocking and thus tending to form a more efficient seal about the shaft and between adjacent rings. In Figs. 8, 8b and 8c the construction of these forms of rings is more clearly illustrated. In Fig. 8 a ring similar to that shown in Fig. 6 is disclosed; 8b shows the construction of rings employed in Fig. 7; in Fig. 8c the end face of the ring 8a is shown and it will be noted in this embodiment that only two of the fluid passages 24 are employed.

For extremely high pressures I find it advisable to further change the construction of the packing discs. In this form the discs 26 are made frusto-conical in shape to interfit with an inclined wall on the end of the cage 27. The gland 28 is also modified on its inner face to fit against the face of the end ring. The packing material within the cage 27 is similar to that employed in the Fig. 3 embodiment. The plates or discs 26, however, are supplied with pressure fluid so as to more efficiently lubricate them against the great force exerted longitudinally upon them by the pressure fluid.

This lubrication of the discs 26 is accomplished by forcing into the space between adjacent discs a pressure fluid from the outside, or, if desired, from the inside. Thus if pressure fluid is obtained from an outside source it will enter through the tube 29 and will pass through the channel 30 to grooves 31 in the adjacent faces of the plates. There are longitudinal openings 32 through the plates connecting the annular grooves and allowing the passage of pressure fluid into the grooves and thus more effectively passing into the spaces between the adjacent discs and properly lubricating them. The pressure fluid may enter the channel 30, if desired, from the interior of the stuffing box and by way of the passage 33 to the channel 30 by way of the valve 34. Said valve is an ordinary plug valve which, by rotation, may open or close the passage from the pipe 29.

Figures 9, 10:
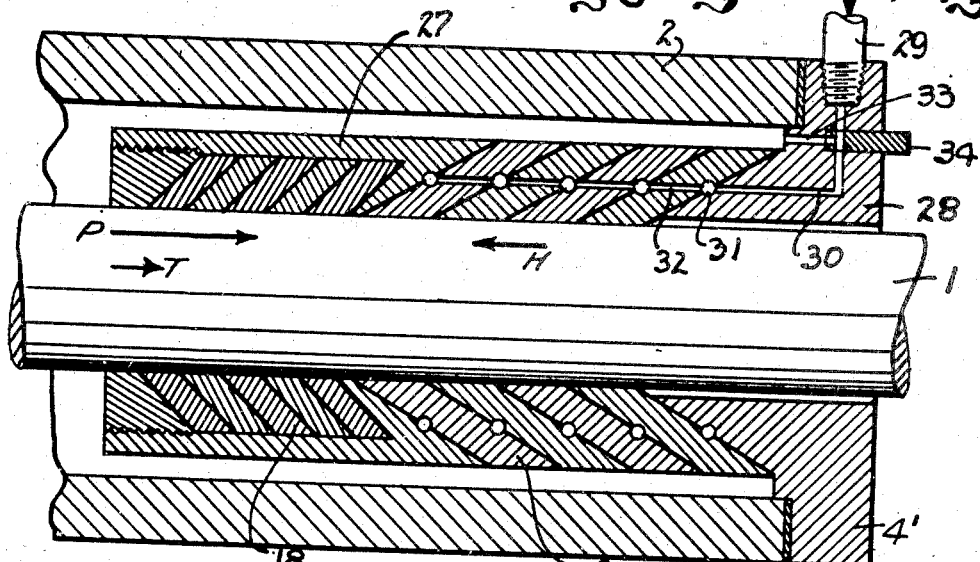
Fig. 9 is a longitudinal section through a packing assembly employed under extremely high pressure conditions and modified somewhat from that shown in Fig. 1.
Fig. 10 is a diagrammatic view illustrating a composition of forces acting on the packing to assist in its operation.
Figure 11:
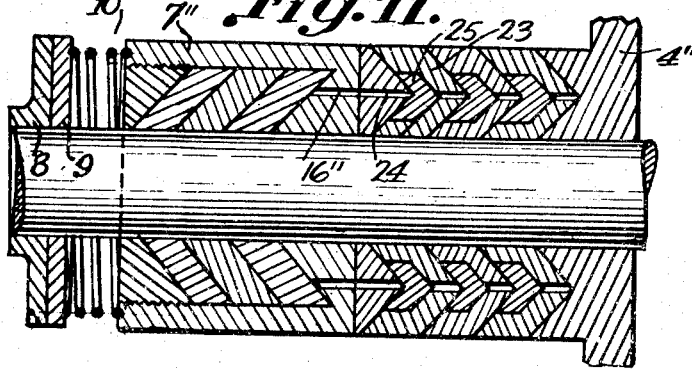

The forces acting upon the packing discs 26 have been illustrated in Figs. 9 and 10 by the arrows. The force of the pressure fluid in the grooves 31 will tend to act perpendicular to the face of each of the discs along the line X in Fig. 10. This force may be resolved into a radial force V and a force H longitudinally of the shaft. The pressure P exerted from the source of pressure longitudinally of the shaft will counteract the horizontal component H leaving a resulting force T tending to compress the packing installation toward the gland 28.

In each of these packing installations the operation is approximately the same. Variations in structure are for the purpose of adapting the inventive idea to pressures of different values, the installation shown in Fig. 9 being where excessive pressures are encountered.

In each of the installations the cage or cartridge 7, 7' or 27 rotates with the shaft but at a speed less than that of the shaft and each of the packing discs 15 or 26 also rotates on the shaft but at a successively lower speed than the cage 27 or the next adjacent discs inwardly toward the source of pressure. The friction between adjacent discs will be relatively slight because of the fact that each of the discs is rotated but has a slower speed than the one adjacent it on the inner side. I thus obtain a seal which may be maintained under high pressures without the development of a material amount of heat and it is the excessive friction which develops heat in the ordinary packing that causes said ordinary packing to break down before it otherwise would. By eliminating excessive friction in my packing I also eliminate the resulting heat and thus provide a packing adapted to endure for relatively long periods of time. This advantage together with the fact that the assembly is flexible and adjustable to movements of the rod or shaft combine to make up an advantageous type of packing for use under high speeds and pressures.

What is claimed as new is:

1. A packing assembly to seal about a rod within a stuffing box subject to fluid pressure including a cage rotatable upon said rod, a plurality of packing rings in said cage, a gland on said box, packing discs between said cage and said gland, said cage and said discs having longitudinal openings therethrough adapted to align to allow passage for pressure fluid, and means to hold said cage upon said discs, said cage and successive discs being rotatable relative to each other on said rod and at different speeds.

2. A packing device for rods to seal off against fluid pressure including a stuffing box, an outer gland thereon, a cage about said rod, a plurality of frusto-conically shaped porous packing rings therein, the smaller end being tapered toward the source of pressure, a plurality of relatively rotatable sealing discs between said cage and said gland, means to hold said cage resiliently against said discs, there being constricted openings through said cage and said discs, and porous annular inserts in the inner faces of adjacent discs to receive pressure fluid passing through said openings.

3. A packing assembly to seal about a rod within a stuffing box subject to high fluid pressure, including a cage rotatable on said rod, packing elements within said cage about said rod, a series of sealing discs on the outer side of said cage, means to hold said cage and discs toward each other, seepage passages for pressure fluid longitudinally of said discs, said discs being relatively rotatable, and porous inserts in said discs positioned to obstruct said passages.

4. A packing assembly to seal about a rod within a stuffing box subject to high fluid pressure, including a cage rotatable on said rod, packing elements within said cage about said rod, a series of sealing discs between said cage and an end wall of said stuffing-box, said discs being V-shaped in cross section, means to force said cage against said discs, seepage passages for pressure fluid longitudinally of said discs, said discs being relatively rotatable, and porous inserts in said discs positioned to obstruct said passages centrally of the concave side of said discs.

HARLEY T. WHEELER.